United States Patent
Kim et al.

(10) Patent No.: US 11,851,121 B2
(45) Date of Patent: Dec. 26, 2023

(54) APPARATUS AND METHOD FOR REDUCING VIBRATION OF STEERING WHEEL

(71) Applicant: HYUNDAI MOBIS CO., LTD., Seoul (KR)

(72) Inventors: In Hyuk Kim, Yongin-si (KR); Pil Woo Lee, Yongin-si (KR); Kwang Woong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 174 days.

(21) Appl. No.: 17/221,390

(22) Filed: Apr. 2, 2021

(65) Prior Publication Data
US 2022/0185368 A1 Jun. 16, 2022

(30) Foreign Application Priority Data
Dec. 10, 2020 (KR) ........................ 10-2020-0172375

(51) Int. Cl.
*B62D 5/04* (2006.01)
*B62D 6/00* (2006.01)
*B62D 6/06* (2006.01)
*B62D 5/00* (2006.01)

(52) U.S. Cl.
CPC ............. *B62D 6/008* (2013.01); *B62D 5/006* (2013.01); *B62D 5/0481* (2013.01)

(58) Field of Classification Search
None
See application file for complete search history.

(56) References Cited

U.S. PATENT DOCUMENTS

| 8,267,220 | B2 * | 9/2012 | Sugiyama | ............ B62D 5/0463 180/443 |
| 2015/0251691 | A1 * | 9/2015 | Tamaizumi | .......... B62D 5/0472 701/41 |
| 2015/0284022 | A1 * | 10/2015 | Kudo | ...................... B62D 6/06 701/41 |
| 2018/0111642 | A1 * | 4/2018 | Endo | ..................... B62D 6/008 |

FOREIGN PATENT DOCUMENTS

KR 2015-0058839 5/2015
KR 2017-0135032 12/2017

OTHER PUBLICATIONS

Korean Office Action dated Jun. 23, 2022 issued in KR 10-2020-0172375.
English Language Abstract of KR 2017-0135032 published Dec. 8, 2017.

* cited by examiner

*Primary Examiner* — Adam D Tissot
*Assistant Examiner* — Laura E Linhardt
(74) *Attorney, Agent, or Firm* — DLA PIPER LLP (US)

(57) ABSTRACT

An apparatus for reducing vibration of a steering wheel may include: a judder compensation logic unit configured to calculate judder compensation torque for removing a judder which occurs in a steering wheel of a vehicle, based on one or more of a motor current, vehicle speed and vehicle wheel speed; and a judder compensation diagnosis unit configured to determine an operation state of the judder compensation logic unit based on one or more of the vehicle wheel speed, steering torque and a brake state.

18 Claims, 9 Drawing Sheets

APPARATUS AND METHOD FOR REDUCING VIBRATION OF STEERING WHEEL

CROSS-REFERENCE TO RELATED APPLICATION

This application claims priority from and the benefit of Korean Patent Application No. 10-2020-0172375, filed on Dec. 10, 2020, which is hereby incorporated by reference for all purposes as if set forth herein.

BACKGROUND

Field

Exemplary embodiments of the present disclosure relate an apparatus and method for reducing vibration of a steering wheel, and more particularly, to an apparatus and method for reducing vibration of a steering wheel, which can extract judder vibration which occurs during a brake operation of a vehicle, and reversely compensate for the corresponding vibration, thereby reducing vibration felt by a driver.

Discussion of the Background

In general, when a driver steps on a brake in a braking situation while the vehicle travels, the operation of the brake may cause a judder, and the judder caused by the operation of the brake is transferred as vibration of a steering wheel.

When the vibration of the steering wheel occurs during the braking situation, the driver feels a sense of unease, and the judder of the steering wheel, which occurs during the braking situation of the vehicle, has an influence on the running stability of the vehicle.

In order to reduce such a judder of the steering wheel in a braking situation of the vehicle, a damping torque injection method or a disturbance suppression method having a specific frequency based on a band-pass filter is used.

However, the damping torque injection method can suppress vibration by changing the overall characteristics of a steering system, but may cause a sense of difference during steering, and the disturbance suppression method having a specific frequency based on a band-pass filter needs to consider changes in magnitude and phase depending on the frequency of a transfer system.

The related art of the present disclosure is disclosed in Korean Patent Application No. 10-2015-0058839 published on May 29, 2015, and entitled 'Steering Wheel Judder Preventing Method and Motor Driven Power Steering therefor'.

SUMMARY

Various embodiments are directed to an apparatus and method for reducing vibration of a steering wheel, which can extract judder vibration which occurs during a brake operation of a vehicle, and reversely compensate for the corresponding vibration, thereby reducing vibration felt by a driver.

In an embodiment, an apparatus for reducing vibration of a steering wheel may include: a judder compensation logic unit configured to calculate judder compensation torque for removing a judder which occurs in a steering wheel of a vehicle, based on one or more of a motor current, vehicle speed and vehicle wheel speed; and a judder compensation diagnosis unit configured to determine an operation state of the judder compensation logic unit based on one or more of the vehicle wheel speed, steering torque and a brake state.

The apparatus may further include a steering motor control logic unit configured to receive the judder compensation torque from the judder compensation logic unit, and remove the judder of the steering wheel by reflecting the judder compensation torque into motor torque.

The judder compensation logic unit may include: a frequency calculator configured to calculate a first rotation frequency and a second rotation frequency from the vehicle wheel speed; a judder compensator configured to extract a judder frequency component by filtering the motor current according to the first or second rotation frequency, and output a compensation current by applying a gain, set for the vehicle speed, to the judder frequency component; and a converter configured to convert the compensation current into compensation torque, and output the compensation torque.

The frequency calculator may calculate the first rotation frequency from the vehicle wheel speed, and calculate the second rotation frequency by multiplying the first rotation frequency by a predetermined multiple.

The judder compensator may include: a first judder compensator configured to extract a first judder frequency component by filtering the motor current according to the first rotation frequency, and output a first compensation current by compensating for the first judder frequency component according to the vehicle speed; a second judder compensator configured to extract a second judder frequency component by filtering the motor current according to the second rotation frequency, and output a second compensation current by compensating for the second judder frequency component according to the vehicle speed; and a calculator configured to output the compensation current obtained by adding up the first and second compensation currents.

The first judder compensator may include: a first judder frequency extraction unit configured to extract a first judder frequency component, caused by the judder, from the motor current through a band-pass filter whose filter coefficient is changed according to the first rotation frequency; a first phase shifting unit configured to shift the phase of the first judder frequency component by applying a phase value, set for the vehicle speed, to the extracted first judder frequency component; and a first gain application unit configured to calculate the first compensation current by applying a gain, set for the vehicle speed, to the phase-shifted first judder frequency component.

The second judder compensator may include: a second judder frequency extraction unit configured to extract a second judder frequency component, caused by the judder, from the motor current through a band-pass filter whose filter coefficient is changed according to the second rotation frequency; a second phase shifting unit configured to shift the phase of the second judder frequency component by applying a phase value, set for the vehicle speed, to the extracted second judder frequency component; and a second gain application unit configured to calculate the second compensation current by applying a gain, set for the vehicle speed, to the phase-shifted second judder frequency component.

The converter may output compensation torque corresponding to a preset limit range from the converted compensation torque.

The judder compensation diagnosis unit may include: a frequency calculator configured to calculate a first rotation frequency and a second rotation frequency from the vehicle wheel speed; a judder frequency extractor configured to extract a judder frequency component, caused by a judder of the steering wheel, by filtering the steering torque according to the first or second rotation frequency; a magnitude calculator configured to calculate the magnitude of the judder signal by filtering the absolute value of a judder signal, generated by the extracted judder frequency component, through a low band-pass filter; and an operation determiner configured to compare the magnitude of the judder signal to a preset threshold value, and determine the operation of the judder compensation logic unit based on the comparison result and a brake state.

The frequency calculator may calculate the first rotation frequency from the vehicle wheel speed, and calculate the second rotation frequency by multiplying the first rotation frequency by a predetermined multiple.

The judder frequency extractor may include: a first judder frequency extraction unit configured to extract a first judder frequency component, caused by the judder, from the steering torque through a band-pass filter whose filter coefficient is changed according to the first rotation frequency; a second judder frequency extraction unit configured to extract a second judder frequency component, caused by the judder, from the steering torque through a band-pass filter whose filter coefficient is changed according to the second rotation frequency; and an addition unit configured to output a judder signal obtained by adding up the first and second judder frequency components.

The operation determiner may output an operation signal for instructing the judder compensation logic unit to operate, when the magnitude of the judder signal is less than the threshold value and the brake is being operated, and output an operation stop signal for instructing the judder compensation logic unit to stop the operation, when the magnitude of the judder signal is equal to or more than the threshold value or the brake is not being operated.

The judder compensation logic unit may perform an operation when receiving the operation signal from the operation determiner, and stop the operation when receiving the operation stop signal from the operation determiner.

In an embodiment, a method for reducing vibration of a steering wheel may include: determining, by a judder compensation diagnosis unit, an operation state of a judder compensation logic unit based on one or more of vehicle wheel speed, steering torque and a brake state, and outputting an operation state signal according to the determined operation state; and receiving, by the judder compensation logic unit, the operation state signal from the judder compensation diagnosis unit, and calculating judder compensation torque for removing a judder which occurs in a steering wheel of a vehicle, based on one or more of a motor current, vehicle speed and the vehicle wheel speed, when the operation state signal is an operation signal.

The method may further include receiving, by a steering motor control logic unit, the judder compensation torque from the judder compensation logic unit, and removing the judder of the steering wheel by reflecting the judder compensation torque into motor torque.

The outputting of the operation state signal may include: calculating, by a frequency calculator, a first rotation frequency and a second rotation frequency from the vehicle wheel speed; extracting, by a judder frequency extractor, a judder frequency component, caused by a judder of the steering wheel, by filtering the steering torque according to the first or second rotation frequency; calculating, by a magnitude calculator, the magnitude of the judder signal by filtering the absolute value of a judder signal, generated by the extracted judder frequency component, through a low band-pass filter; and comparing, by an operation determiner, the magnitude of the judder signal to a preset threshold value, determining an operation state of the judder compensation logic unit based on the comparison result and a brake state, and outputting an operation state signal according to the determined operation state.

In the calculating of the first and second rotation frequencies, the frequency calculator may calculate the first rotation frequency from the vehicle wheel speed, and calculate the second rotation frequency by multiplying the first rotation frequency by a predetermined multiple.

The extracting of the judder frequency component may include: extracting, by the judder frequency extractor, a first judder frequency component, caused by the judder, from the steering torque through a band-pass filter whose filter coefficient is changed according to the first rotation frequency; extracting, by the judder frequency extractor, a second judder frequency component, caused by the judder, from the steering torque through a band-pass filter whose filter coefficient is changed according to the second rotation frequency; and outputting, by the judder frequency extractor, a judder signal obtained by adding up the first and second judder frequency components.

In the determining of the operation of the judder compensation logic unit, the operation determiner may output an operation signal for instructing the judder compensation logic unit to operate, when the magnitude of the judder signal is less than the threshold value and the brake is being operated, and output an operation stop signal for instructing the judder compensation logic unit to stop the operation, when the magnitude of the judder signal is equal to or more than the threshold value or the brake is not being operated.

The calculating of the judder compensation torque may include: calculating, by a frequency calculator, a first rotation frequency and a second rotation frequency from the vehicle wheel speed; extracting, by a judder compensator, a judder frequency component by filtering the motor current according to the first or second rotation frequency, and outputting a compensation current by applying a gain, set for the vehicle speed, to the judder frequency component; and converting, by a converter, the compensation current into compensation torque, and outputting the compensation torque.

In the calculating of the first and second rotation frequencies, the frequency calculator may calculate the first rotation frequency from the vehicle wheel speed, and calculate the second rotation frequency by multiplying the first rotation frequency by a predetermined multiple.

The outputting of the compensation current may include: extracting, by a first judder compensator, a first judder frequency component by filtering the motor current according to the first rotation frequency, and outputting a first compensation current by compensating for the first judder frequency component according to the vehicle speed; extracting, by a second judder compensator, a second judder frequency component by filtering the motor current according to the second rotation frequency, and outputting a second compensation current by compensating for the second judder frequency component according to the vehicle speed; and outputting, by a calculator, the compensation current obtained by adding up the first and second compensation currents.

The outputting of the first compensation current may include: extracting, by the first judder compensator, a first judder frequency component, caused by the judder, from the motor current through a band-pass filter whose filter coefficient is changed according to the first rotation frequency;

shifting, by the first judder compensator, the phase of the first judder frequency component by applying a phase value, set for the vehicle speed, to the extracted first judder frequency component; and calculating, by the first judder compensator, the first compensation current by applying a gain, set for the vehicle speed, to the phase-shifted first judder frequency component.

The outputting of the second compensation current may include: extracting, by the second judder compensator, a second judder frequency component, caused by the judder, from the motor current through a band-pass filter whose filter coefficient is changed according to the second rotation frequency; shifting, by the second judder compensator, the phase of the second judder frequency component by applying a phase value, set for the vehicle speed, to the extracted second judder frequency component; and calculating, by the second judder compensator, the second compensation current by applying a gain, set for the vehicle speed, to the phase-shifted second judder frequency component.

In the converting of the compensation current into the compensation torque, the converter may output compensation torque corresponding to a preset limit range from the converted compensation torque.

In accordance with the embodiments of the present disclosure, the apparatus and method for reducing vibration of a steering wheel can extract judder vibration which occurs during a brake operation of a vehicle, and reversely compensate for the corresponding vibration, thereby reducing vibration felt by a driver.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hardwired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for reducing vibration of a steering wheel will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 1:
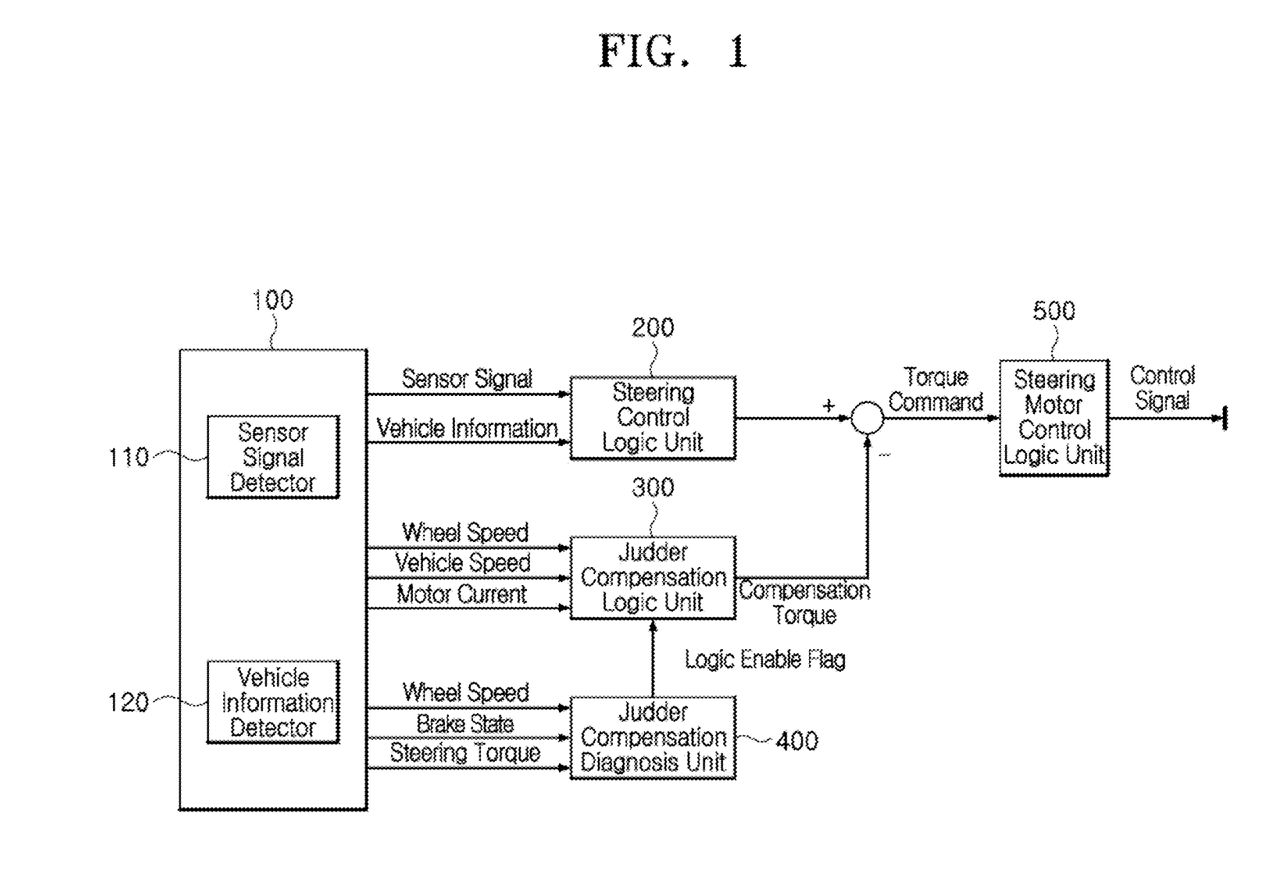
FIG. 1 is a block diagram illustrating a schematic configuration of an apparatus for reducing vibration of a steering wheel in accordance with an embodiment of the present disclosure.

FIG. 1 is a block diagram illustrating a schematic configuration of an apparatus for reducing vibration of a steering wheel in accordance with an embodiment of the present disclosure.

Referring to FIG. 1, the apparatus for reducing vibration of a steering wheel in accordance with the embodiment of the present disclosure includes a detection unit 100, a steering control logic unit 200, a judder compensation logic unit 300, a judder compensation diagnosis unit 400 and a steering motor control logic unit 500.

The detection unit 100 detects information required for reducing vibration of a steering wheel by a brake judder. The detection unit 100 may include a sensor signal detector 110 and a vehicle information detector 120. The sensor signal detector 110 detects a sensor signal including a motor current, steering torque and the like, and the vehicle information detector 120 detects vehicle information including one or more of wheel speed, vehicle speed and a brake state. The brake state may be information indicating whether a brake is operated, for example, whether a brake pedal is stepped.

The steering control logic unit 200 receives the sensor signal and the vehicle information from the detection unit 100, and outputs a motor torque command for steering control based on the received sensor signal and vehicle information. Since those skilled in the art can easily carry out that the steering control logic unit 200 outputs the motor torque command for steering control, the detailed descriptions thereof will be omitted herein.

The judder compensation logic unit 300 may receive an operation state signal from the judder compensation diagnosis unit 400, and operate when the operation state signal is an operation signal.

The judder compensation logic unit 300 receives one or more of a motor current, vehicle speed and vehicle wheel speed from the detection unit 100, and calculates judder compensation torque for removing a judder which occurs in the steering wheel of the vehicle, based on one or more of the received motor current, vehicle speed and vehicle wheel speed. That is, the judder compensation logic unit 300 may detect a disturbance component caused by the brake judder, and compensate for a motor torque command.

The detailed descriptions of the judder compensation logic unit 300 will be made with reference to FIG. 2.

The judder compensation diagnosis unit 400 determines the operation state of the judder compensation logic unit 300, and transmits an operation state signal for the determined operation state to the judder compensation logic unit 300, in order to prevent a malfunction of the judder compensation logic unit 300.

That is, the judder compensation diagnosis unit 400 may receive one or more of the vehicle steering wheel speed, the steering torque and the brake state from the detection unit 100, determine the operation state of the judder compensation logic unit 300 based on one or more of the received vehicle steering wheel speed, steering torque and brake state, and output the operation state signal depending on the operation state. The operation state signal may be an operation signal for instructing the judder compensation logic unit 300 to operate or an operation stop signal for instructing the judder compensation logic unit 300 to stop the operation.

For example, when the operation state of the judder compensation logic unit 300 is determined as the operation, the judder compensation diagnosis unit 400 may transmit a logic enable flag of "1" as the operation signal to the judder compensation logic unit 300. Furthermore, when the operation state of the judder compensation logic unit 300 is determined as the operation stop, the judder compensation diagnosis unit 400 may transmit a logic enable flag of "0" as the operation stop signal to the judder compensation logic unit 300.

The detailed descriptions of the judder compensation logic unit 300 will be made with reference to FIG. 5.

The steering motor control logic unit 500 receives a motor torque command and judder compensation torque from the steering control logic unit 200 and the judder compensation logic unit 300, and reflects the judder compensation torque into the received motor torque command, thereby removing the judder of the steering wheel.

That is, the steering motor control logic unit 500 may control the motor according to the motor torque command into which the judder compensation torque is reflected. As the motor torque control is performed, the judder may be removed through an MOPS (Motor Driven Power Steering) before being transferred to the steering wheel. Thus, the apparatus for reducing vibration of a steering wheel can prevent vibration of the steering wheel, which may degrade the stability of the vehicle, while controlling the MOPS in a software manner without using a separate mechanism.

The apparatus for reducing vibration of a steering wheel, which has the above-described configuration, may extract judder vibration which occurs during a brake operation, and reversely compensate for the corresponding vibration component. This operation may reduce the vibration of the steering wheel, thereby reducing vibration felt by a driver.

Figure 2:
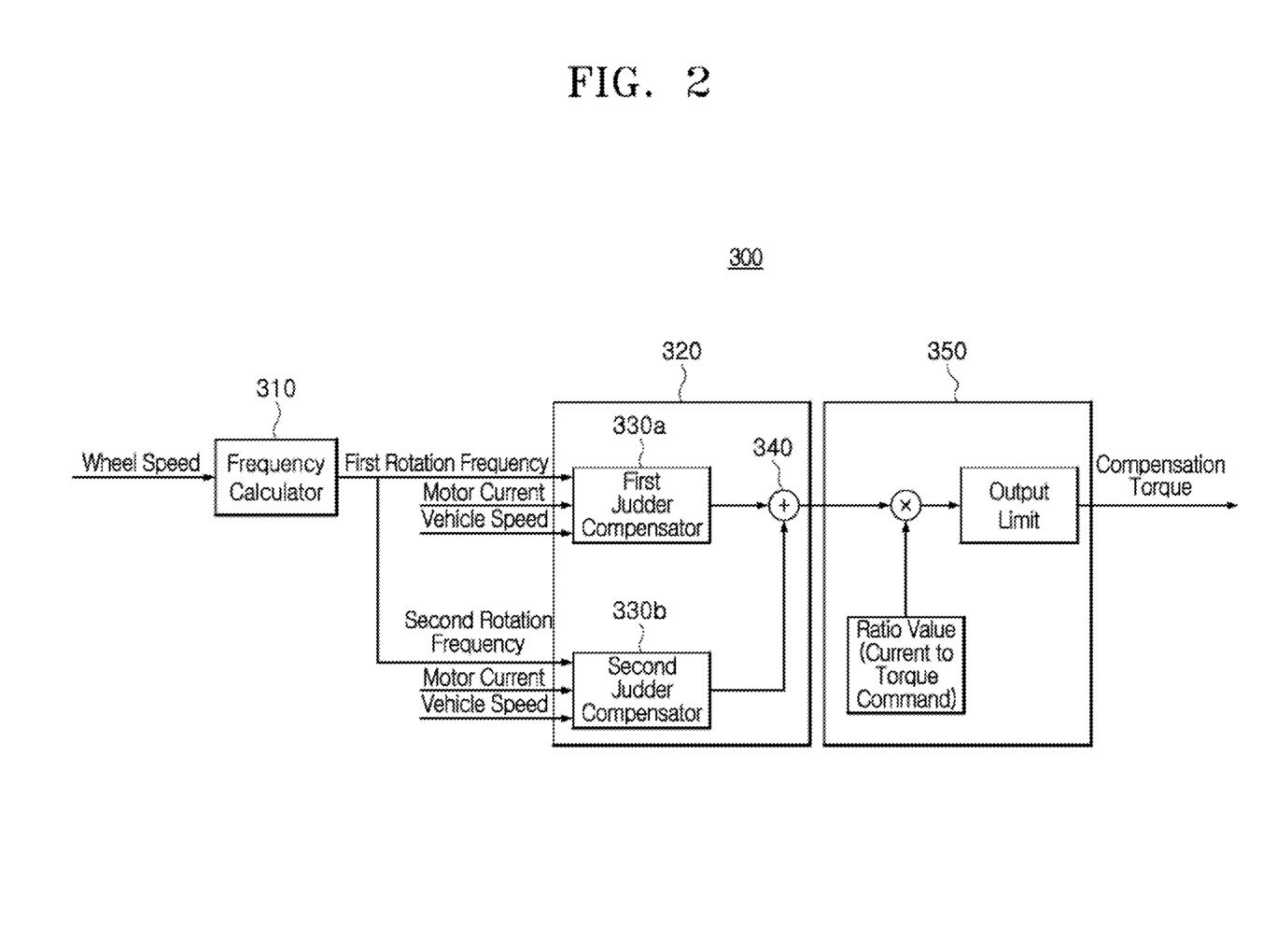
FIG. 2 is a block diagram for describing a configuration of a judder compensation logic unit in accordance with the embodiment of the present disclosure.
Figure 3:
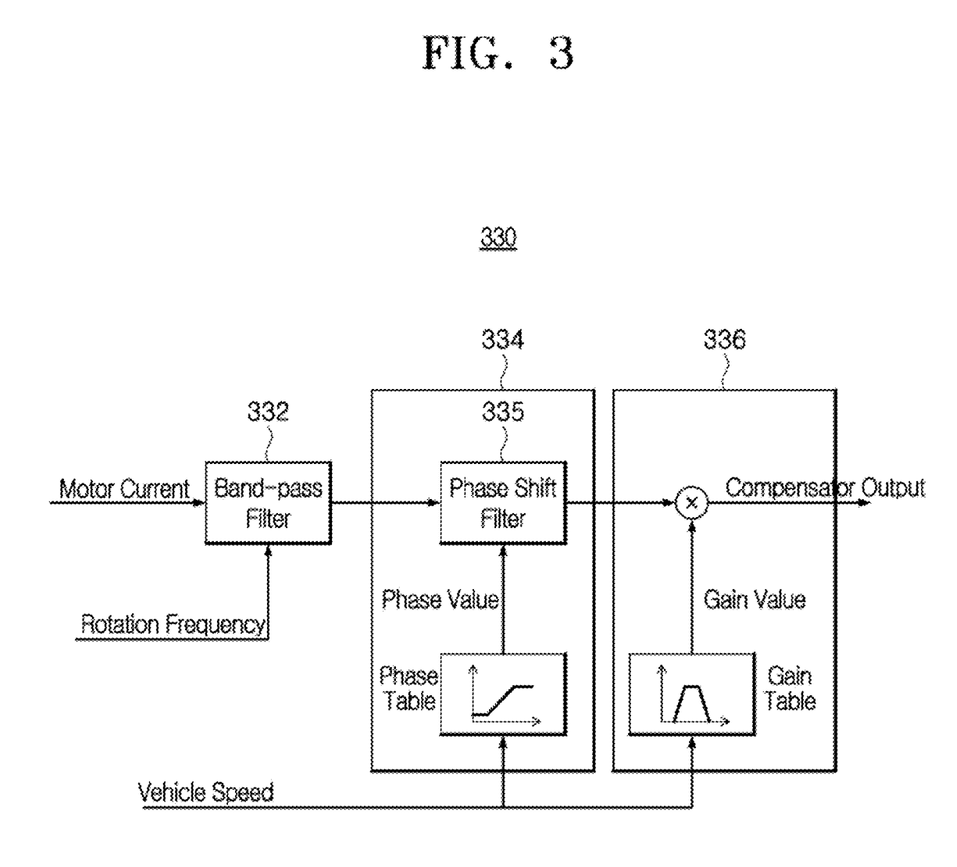
FIG. 3 is a block diagram for describing a configuration of a judder compensator illustrated in FIG. 2.
Figure 4A:
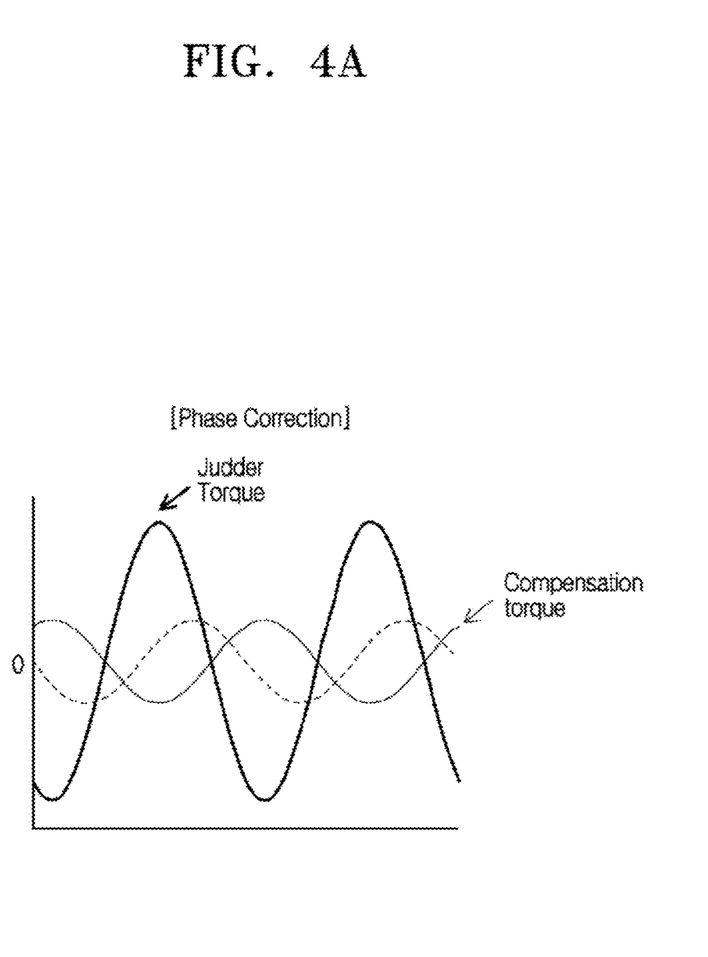
FIGS. 4A and 4B are graphs for describing a motor current compensated by the judder compensator in accordance with the embodiment of the present disclosure.
Figure 4B:
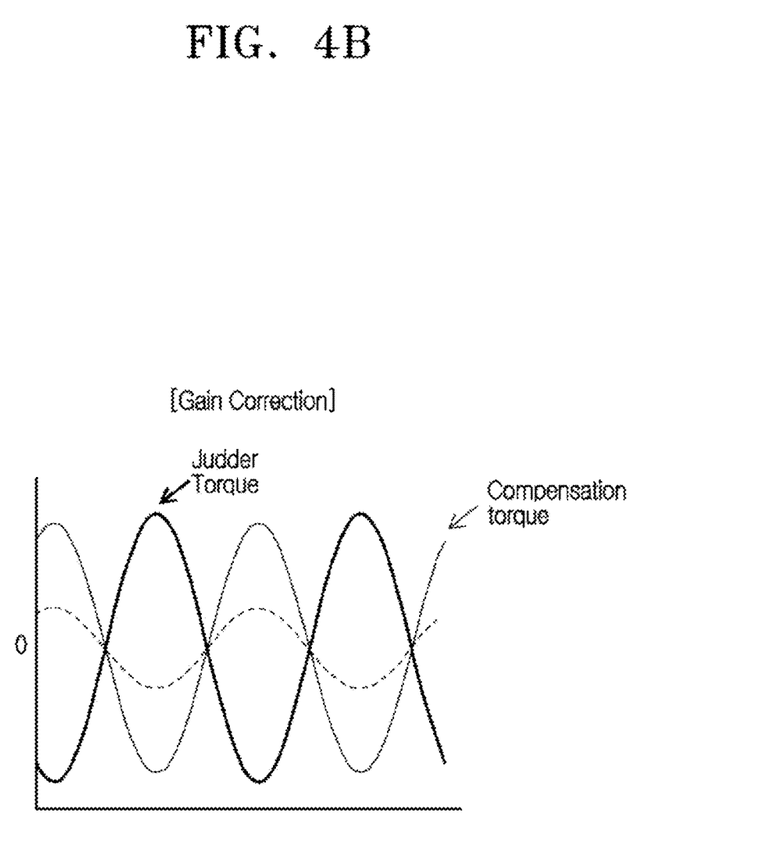

FIG. 2 is a block diagram for describing a configuration of the judder compensation logic unit in accordance with the embodiment of the present disclosure, FIG. 3 is a block diagram for describing a configuration of a judder compensator illustrated in FIG. 2, and FIGS. 4A and 4B are graphs for describing a motor current compensated by the judder compensator in accordance with the embodiment of the present disclosure.

Referring to FIG. 2, the judder compensation logic unit 300 includes a frequency calculator 310, a judder compensator 320 and a converter 350.

The frequency calculator 310 calculates a first rotation frequency and a second rotation frequency from the vehicle wheel speed. At this time, the frequency calculator 310 may calculate the first rotation frequency from front wheel speed of the vehicle, and calculate the second rotation frequency by multiplying the first rotation frequency by a predetermined multiple. For example, the frequency calculator 310 may calculate the second rotation frequency by multiplying the first rotation frequency by 2.

This is because the vibration frequency of the brake judder physically almost coincides with the rotation frequency of a vehicle wheel. Also, this is in order to generate a signal waveform for reducing a judder using the rotation frequency of the vehicle wheel.

The judder compensator 320 receives the first and second rotation frequencies, the motor current and the vehicle speed, and calculates a compensation value in real time. Specifically, the judder compensator 320 extracts a judder frequency component by filtering the motor current according to the first or second rotation frequency, and calculates a compensation current by applying a gain, set for the vehicle speed, to the judder frequency component, and outputs the compensation current.

The judder compensator 320 includes a first judder compensator 330a, a second judder compensator 330b and a calculator 340.

The first judder compensator 330a extracts a first judder frequency component by filtering the motor current according to the first rotation frequency, and outputs a first compensation current by compensating for the first judder frequency component according to the vehicle speed.

As illustrated in FIG. 3, the first judder compensator 330a may include a first judder frequency extraction unit 332, a first phase shifting unit 334 and a first gain application unit 336.

The first judder frequency extraction unit 332 receives the motor current and the first rotation frequency, and extracts the first judder frequency component, caused by the judder of the steering wheel, by filtering the motor current according to the first rotation frequency.

The motor current received by the first judder frequency extraction unit 332 may be a motor current which is detected by adding up a motor current generated by the operation of the motor and a motor current generated by the judder of the steering wheel. That is, the motor current detected by the operation of the motor may include a motor current which is generated according to a driver's steering intention and a motor current which is generated by a brake judder in a braking situation of the vehicle, and the first judder frequency extraction unit 332 extracts only a motor current component, generated by vibration of the steering wheel depending on a brake judder, by filtering the motor current detected from the motor.

The first judder frequency extraction unit 332 may be implemented as a band-pass filter, for example.

The first judder frequency extraction unit 332 may use the first rotation frequency, calculated by the frequency calculator 310, as a center frequency, and extract the first judder frequency component from the motor current through the band-pass filter having a predetermined bandwidth.

That is, the first judder frequency extraction unit 332 filters, from the motor current detected from the motor, a low-frequency band component of 2 Hz or less, which corresponds to input torque of the driver, and a high-frequency band component of 20 to 25 Hz, to which the steering wheel does not react, and extracts only a band component of 5 to 20 Hz, which reacts as the vibration of the steering wheel.

The frequency band filtered by the first judder frequency extraction unit 332 may be set differently for each vehicle type. The low-frequency band and the high-frequency band, which are filtered by the first judder frequency extraction unit 332, may be set differently for each vehicle type. Furthermore, the low-frequency band and the high-frequency band may be set in such a manner that the first judder frequency extraction unit 332 can filter, from the motor current detected from the motor, a motor current generated by a driver's steering intention and a motor current corresponding to a band to which the steering wheel does not react, and extract only a motor current corresponding to a frequency band generated by vibration of the steering wheel.

The first judder frequency extraction unit 332 extracts only the first judder frequency component in the band which reacts to the vibration of the steering wheel, by filtering the received motor current, and transfers a motor current corresponding to the extracted first judder frequency component to the first phase shifting unit 334.

The first phase shifting unit 334 may shift the phase of the first judder frequency component by applying a phase value, set for the vehicle speed, to the first judder frequency component extracted by the first judder frequency extraction unit 332. The first phase shifting unit 334 may be implemented as a first phase shift filter 335.

The first phase shift filter 335 may acquire the phase value corresponding to the vehicle speed from a phase table in which phase values are set according to vehicle speeds, and shift the phase of the first judder frequency component according to the acquired phase value.

The first gain application unit 336 receives the vehicle speed from the detection unit 100, receives the phase-shifted first judder frequency component from the first phase shifting unit 334, and outputs the first compensation current by applying a gain, set for the received vehicle speed, to the received first judder frequency component. That is, the first gain application unit 336 may acquire a gain corresponding to the vehicle speed from a gain table in which gains are set according to vehicle speeds, and adjust the magnitude of the first compensation current by applying the acquired gain to the phase-shifted first judder frequency component.

The first judder compensator 330a configured in such a manner may output compensation torque illustrated in FIG. 4A when the phase of the first judder frequency component (judder torque) is shifted, and output compensation torque illustrated in FIG. 4B when the gain set for the vehicle speed is applied.

The second judder compensator 330b extracts a second judder frequency component by filtering the motor current according to the second rotation frequency, and outputs a second compensation current by compensating for the second judder frequency component according to the vehicle speed.

The second judder compensator 330b may include a second judder frequency extraction unit, a second phase shifting unit and a second gain application unit. Since the second judder frequency extraction unit, the second phase shifting unit and the second gain application unit operate in the same manner as the first judder frequency extraction unit, the first phase shifting unit and the first gain application unit of the first judder compensator 330a, the detailed descriptions thereof will be omitted herein.

The calculator 340 receives the first compensation current and the second compensation current from the first judder compensator 330a and the second judder compensator 330b, and outputs a compensation current obtained by adding up the received first and second compensation currents.

The converter 350 converts the compensation current from the judder compensator 320 into compensation torque. At this time, the converter 350 may output compensation torque corresponding to a preset range limit.

That is, the converter 350 may convert the compensation current into torque command units (Nm), apply a limit value to the compensation torque, and output the compensation torque.

Figure 5:
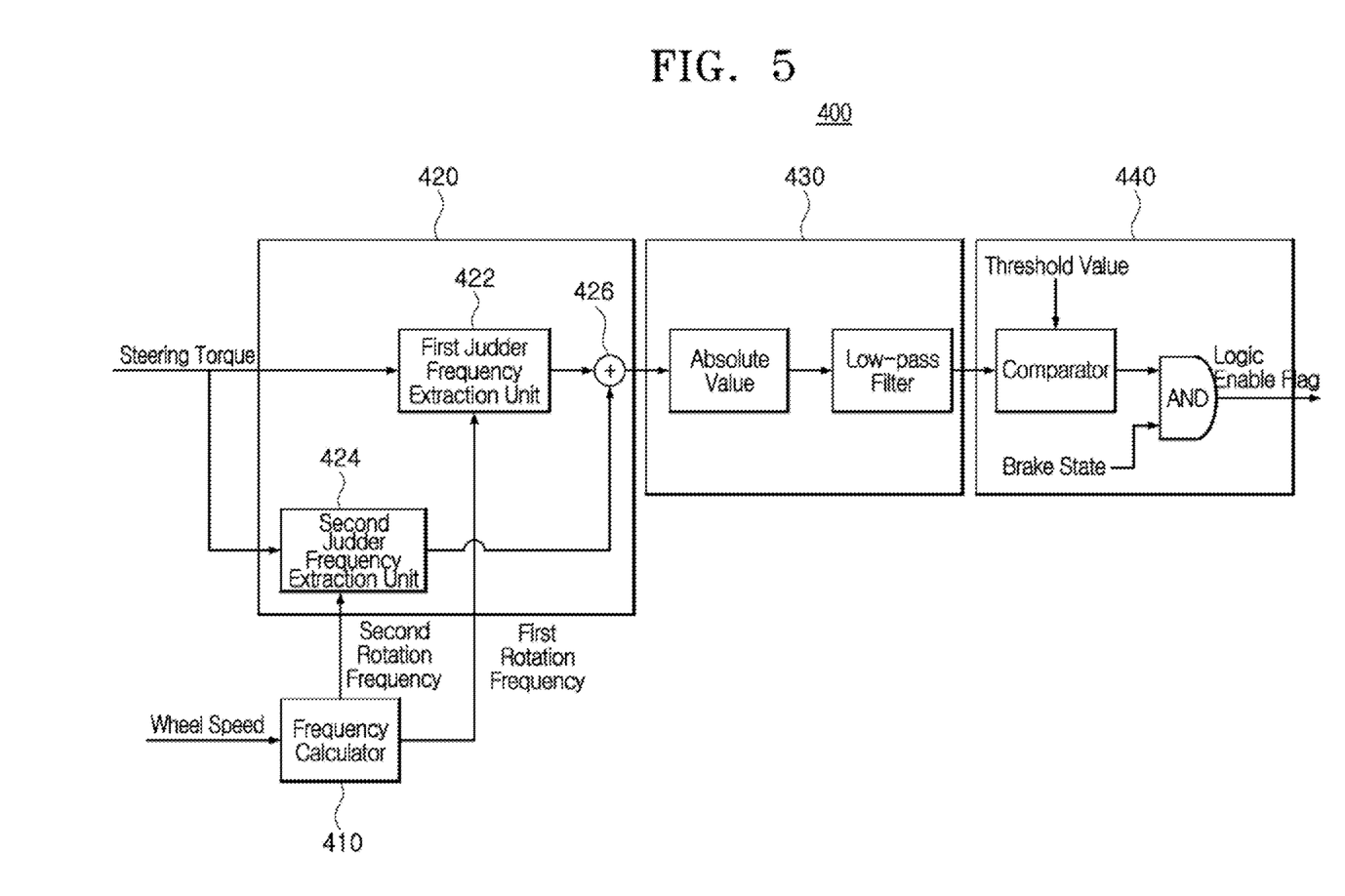
FIG. 5 is a block diagram for describing a configuration of a judder compensation diagnosis unit in accordance with the embodiment of the present disclosure.
Figure 6A:
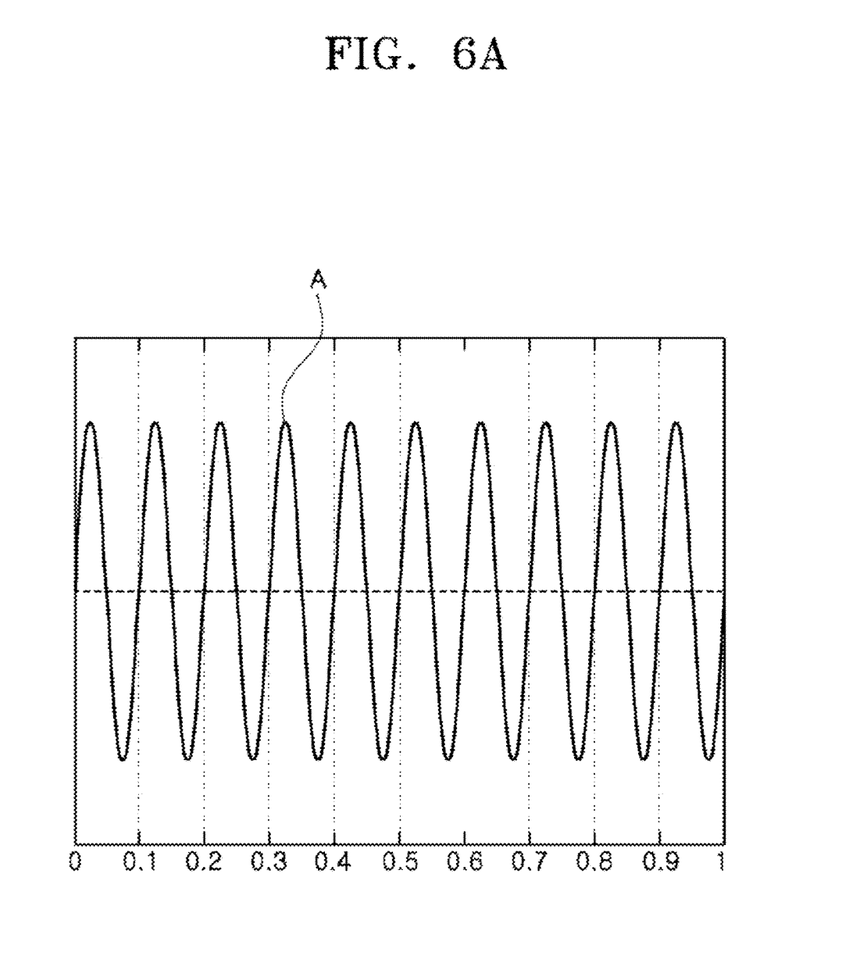
FIGS. 6A and 6B are graphs for describing steering torque depending on an operation of the judder compensation diagnosis unit in accordance with the embodiment of the present disclosure.
Figure 6B:
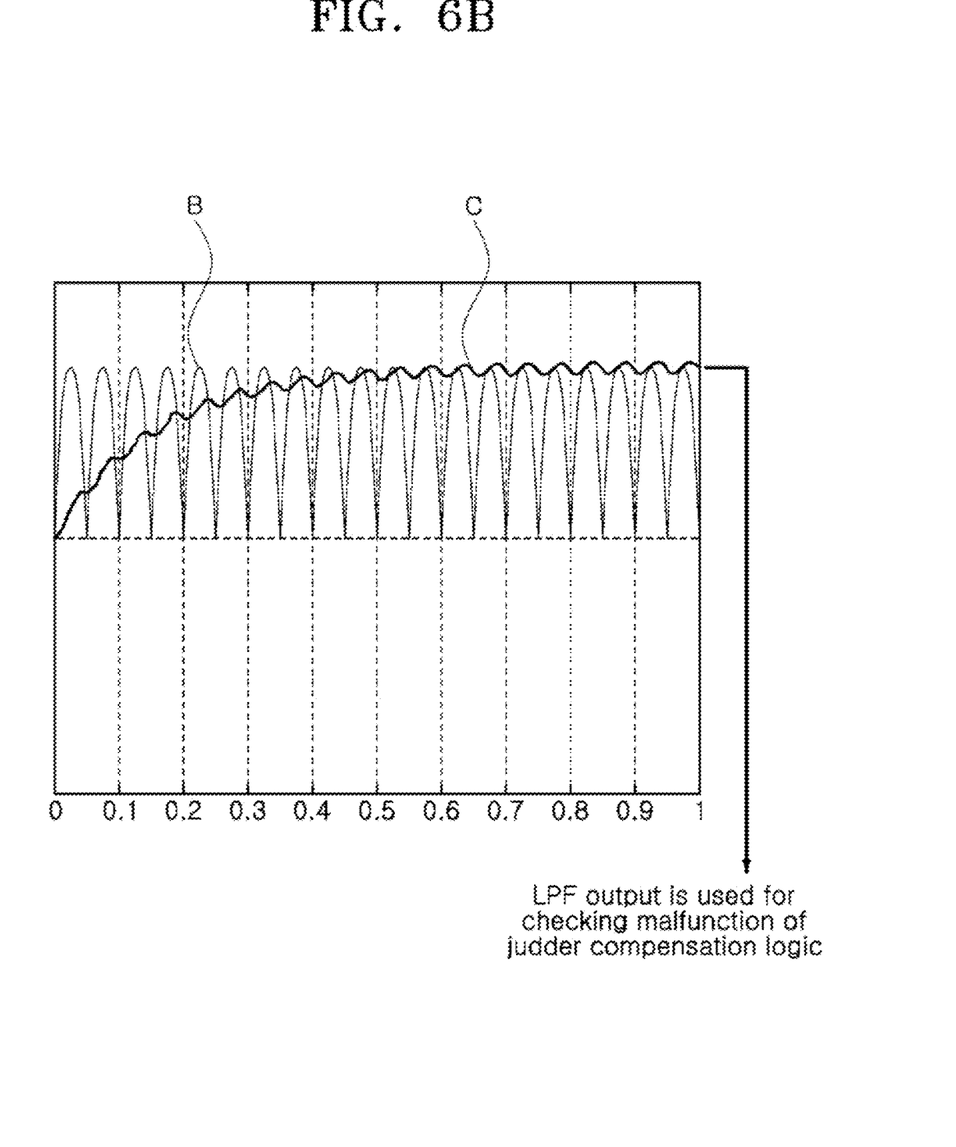

FIG. 5 is a block diagram for describing a configuration of the judder compensation diagnosis unit in accordance with the embodiment of the present disclosure, and FIGS. 6A and 6B are diagrams for describing steering torque depending on an operation of the judder compensation diagnosis unit in accordance with the embodiment of the present disclosure.

Referring to FIG. 5, the judder compensation diagnosis unit 400 in accordance with the embodiment of the present disclosure includes a frequency calculator 410, a judder frequency extractor 420, a magnitude calculator 430 and an operation determiner 440.

The frequency calculator 410 calculates a rotation frequency from the vehicle wheel speed. At this time, the frequency calculator 410 may calculate the first rotation frequency from front wheel speed of the vehicle, and calculate the second rotation frequency by multiplying the first rotation frequency by a predetermined multiple. For example, the frequency calculator 410 may calculate the second rotation frequency by multiplying the first rotation frequency by 2.

This is because the vibration frequency of the brake judder physically almost coincides with the rotation frequency of a vehicle wheel. Also, this is in order to generate a signal waveform for reducing a judder using the rotation frequency of the vehicle wheel.

The judder frequency extractor 420 receives steering torque and the rotation frequency calculated by the frequency calculator 410, and filters the steering torque according to the rotation frequency, thereby extracting a judder frequency component caused by the judder of the steering wheel. At this time, the judder frequency extractor 420 may extract the judder frequency component from the steering torque through a band-pass filter whose filter coefficient is varied according to a frequency.

Such a judder frequency extractor 420 may include a first judder frequency extraction unit 422, a second judder frequency extraction unit 424 and an addition unit 426.

The first judder frequency extraction unit 422 receives the steering torque and the first rotation frequency, and extracts a first judder frequency component, caused by the judder of the steering wheel, by filtering the steering torque according to the first rotation frequency.

The steering torque received by the first judder frequency extraction unit 422 from a torque sensor may be steering torque detected by adding up steering torque generated by the rotation of the steering wheel and steering torque generated by the judder of the steering wheel. That is, the steering torque detected by the torque sensor may include steering torque which is generated according to a driver's steering intention and steering torque which is generated by a brake judder in a braking situation of the vehicle, and the first judder frequency extraction unit 422 extracts only a steering torque component, generated by vibration of the steering wheel depending on a brake judder, by filtering the steering torque received from the torque sensor.

The first judder frequency extraction unit 422 may be implemented as a band-pass filter, for example.

The first judder frequency extraction unit 422 may use the first rotation frequency, calculated by the frequency calculator 410, as a center frequency, and extract the first judder frequency component from the steering torque through a first band-pass filter having a predetermined bandwidth.

That is, the first judder frequency extraction unit 422 filters, from the steering torque received from the torque sensor, a low-frequency band component of 2 Hz or less, which corresponds to input torque of the driver, and a high-frequency band component of 20 to 25 Hz, to which the steering wheel does not react, and extracts only a band component of 5 to 20 Hz, which reacts as the vibration of the steering wheel.

The frequency band filtered by the first band-pass filter may be set differently for each vehicle type. The low-frequency band and the high-frequency band, which are filtered by the first band-pass filter, may be set differently for each vehicle type. Furthermore, the low-frequency band and the high-frequency band may be set in such a manner that the first band-pass filter can filter, from the steering torque received from the torque sensor, steering torque generated by a driver's steering intention and steering torque corresponding to a band to which the steering wheel does not react, and extract only steering torque corresponding to a frequency band generated by the vibration of the steering wheel.

The first judder frequency extraction unit 422 extracts only a first judder frequency component in the band which reacts to the vibration of the steering wheel, by filtering the received steering torque, and transfers steering torque corresponding to the extracted first judder frequency component to the addition unit 426.

The second judder frequency extraction unit 424 receives the steering torque and the second rotation frequency, and extracts a second judder frequency component, caused by the judder of the steering wheel, by filtering the steering torque according to the second rotation frequency. Since the second judder frequency extraction unit 424 operates in the same manner as the first judder frequency extraction unit 422, the detailed descriptions thereof will be omitted herein.

The addition unit 426 receives the first and second judder frequency components from the first and second judder frequency extraction units 422 and 424, and outputs a judder signal obtained by adding up the received first and second judder frequency components.

The magnitude calculator 430 calculates the magnitude of the judder signal by low-pass filtering the absolute value of the judder signal extracted by the judder frequency extractor 420. That is, the magnitude calculator 430 may approximately calculate the magnitude of the judder signal by applying the absolute value of the judder signal to a low band-pass filter. The frequency band filtered by the low band-pass filter may be set differently for each vehicle type.

For example, when the judder signal extracted by the judder frequency extractor 420 is indicated by 'A' in FIG. BA, the magnitude calculator 430 may output the absolute value of 'A' as indicated by 'B' in FIG. 6B. When 'B' is applied to the low band-pass filter, the magnitude calculator 430 may output a signal as indicated by 'C'.

The operation determiner 440 compares the magnitude of the judder signal calculated by the magnitude calculator 430 to a preset threshold value, and determines the operation state of the judder compensation logic unit 300 based on the comparison result and the brake state. At this time, the operation determiner 440 may compare the magnitude of the judder signal to the threshold value through a comparator, and determine the operation of the judder compensation logic unit 300 according to the comparison result and the brake state.

For example, when the magnitude of the judder signal is less than the threshold value, the operation determiner 440 may determine that there is no bad influence by the judder compensation logic unit 300, and determine that the judder compensation logic unit 300 can continuously operate. At this time, the operation determiner 440 may output a signal which controls the judder compensation logic unit 300 to operate only when the brake pedal is stepped on, even though it is determined that the judder compensation logic unit 300 can continuously operate. Furthermore, when the magnitude of the judder signal is equal to or more than the threshold value, the operation determiner 440 may determine that vibration has been amplified by the judder compensation logic unit 300, and determine that the operation of the judder compensation logic unit 300 is to be stopped.

When the magnitude of the judder signal is less than the threshold value and the brake is being operated, the operation determiner 440 may output an operation signal for instructing the judder compensation logic unit 300 to operate. Furthermore, when the magnitude of the judder signal is equal to or more than the threshold value or the brake is not being operated, the operation determiner 440 may output an operation stop signal for instructing the judder compensation logic unit 300 to stop the operation.

The judder compensation logic unit 300 may operate when receiving the operation signal from the operation determiner 440, and stop the operation when receiving the operation stop signal.

Figure 7:
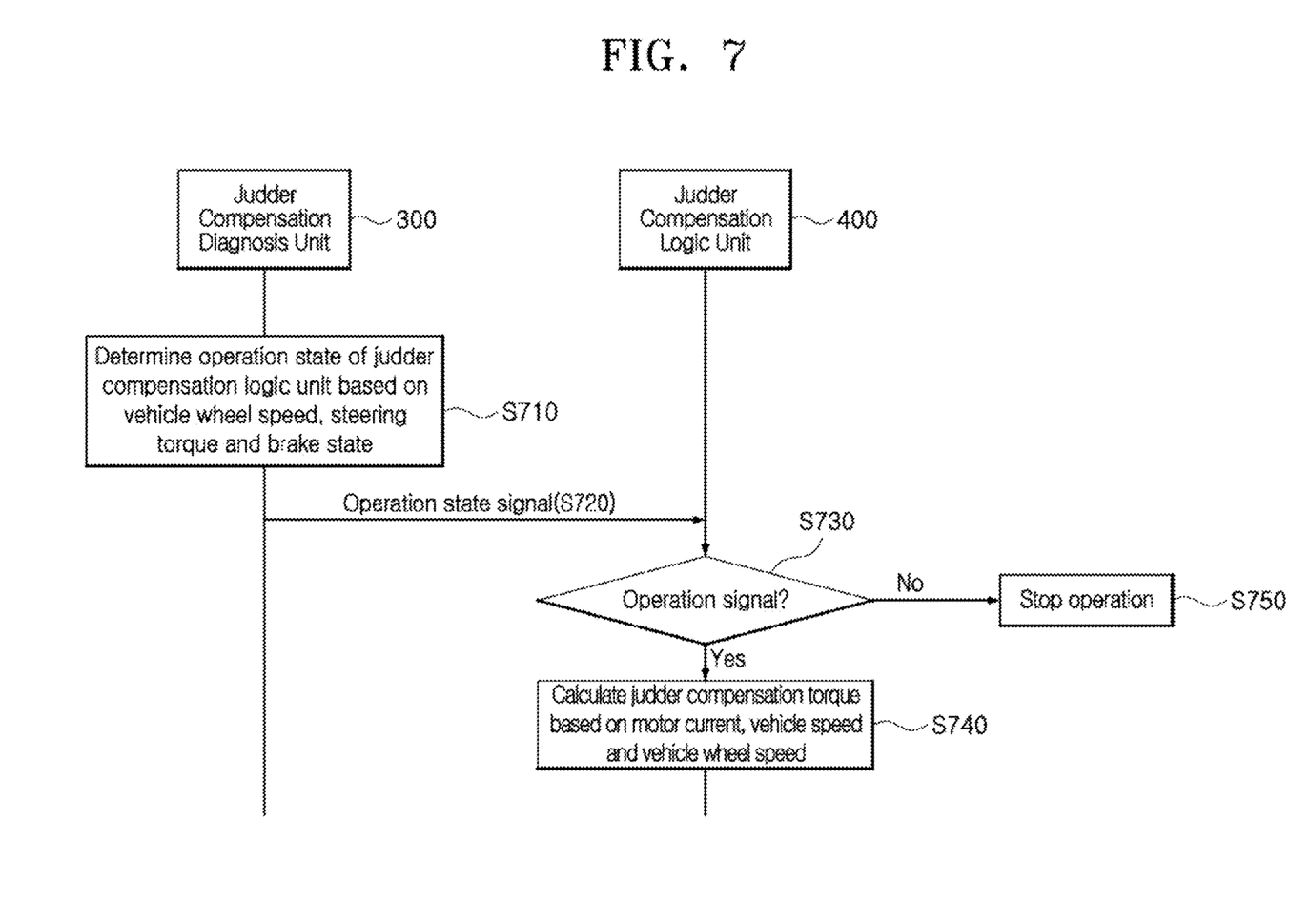
FIG. 7 is a diagram for describing a method for reducing vibration of a steering wheel in accordance with an embodiment of the present disclosure.

FIG. 7 is a diagram for describing a method for reducing vibration of a steering wheel in accordance with an embodiment of the present disclosure.

Referring to FIG. 7, the judder compensation diagnosis unit 400 determines the operation state of the judder compensation logic unit 300 based on one or more of vehicle wheel speed, steering torque and a brake state, in step S710, and transmits an operation state signal for the determined operation state to the judder compensation logic unit 300 in step S720. That is, the judder compensation diagnosis unit 400 may calculate a first rotation frequency and a second rotation frequency from the vehicle wheel speed, and extract a judder frequency component, caused by a judder of the steering wheel, by filtering steering torque according to the first or second rotation frequency. Then, the judder compensation diagnosis unit 400 may calculate the magnitude of a judder signal generated by the extracted judder frequency component by low-pass filtering the absolute signal of the judder signal, and compare the magnitude of the judder signal to a preset threshold value. When the brake is being operated and the comparison result indicates that the magnitude of the judder signal is less than the threshold value, the judder compensation diagnosis unit 400 may output an operation signal for instructing the judder compensation logic unit 300 to operate. When the brake is not being operated or the comparison result indicates that the magnitude of the judder signal is equal to or more than the threshold value, the judder compensation diagnosis unit 400 may output an operation stop signal for instructing the judder compensation logic unit 300 to stop the operation.

When step S720 is performed, the judder compensation logic unit 300 determines that the operation state signal is the operation signal, in step S730.

When the determination result of step S730 indicates that the operation state signal is the operation signal, the judder compensation logic unit 300 calculates judder compensation torque for removing a judder which occurs in the steering wheel of the vehicle, based on one or more of a motor current, vehicle speed and the vehicle wheel speed, in step S740.

The judder compensation logic unit 300 may transmit the calculated judder compensation torque to the steering motor control logic unit 500, and the steering motor control logic unit 500 may remove the judder of the steering wheel by reflecting the judder compensation torque into motor torque.

When the determination result of step S730 indicates that the operation state signal is the operation stop signal, the judder compensation logic unit 300 stops the operation in step S750.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for reducing vibration of a steering wheel, the apparatus comprising:
   a judder compensation logic unit configured to calculate judder compensation torque for removing a judder which occurs in a steering wheel of a vehicle, based on one or more of a motor current, vehicle speed and vehicle wheel speed;
   a judder compensation diagnosis unit configured to determine an operation state of the judder compensation logic unit based on the vehicle wheel speed, steering torque and a brake state and output an operation state signal according to the determined operation state, the operation state signal instructing the judder compensation logic to operate when a magnitude of a judder signal is below a preset threshold value or instructing the judder compensation logic to stop operating when the magnitude of the judder signal is equal to or more than the preset threshold value, the judder compensation diagnosis unit comprising:
      a frequency calculator configured to calculate a first rotation frequency and a second rotation frequency from the vehicle wheel speed;
      a judder frequency extractor configured to extract a judder frequency component, caused by a judder of the steering wheel, by filtering the steering torque according to the first or second rotation frequency;
      a magnitude calculator configured to calculate the magnitude of the judder signal by filtering an absolute value of the judder signal, generated by the extracted judder frequency component, through a low band-pass filter; and
      an operation determiner configured to compare the magnitude of the judder signal to the preset threshold value, and determine the operation of the judder compensation logic unit based on a comparison result and a brake state; and
   the judder compensation logic unit further configured to calculate the judder compensation torque based on receiving the operation state signal instructing the judder compensation logic unit to operate.

2. The apparatus of claim 1, further comprising a steering motor control logic unit configured to receive the judder compensation torque from the judder compensation logic unit, and remove the judder of the steering wheel by reflecting the judder compensation torque into motor torque.

3. The apparatus of claim 1, wherein the judder compensation logic unit comprises:
   a frequency calculator configured to calculate a first rotation frequency and a second rotation frequency from the vehicle wheel speed;
   a judder compensator configured to extract a judder frequency component by filtering the motor current according to the first or second rotation frequency, and output a compensation current by applying a gain, set for the vehicle speed, to the judder frequency component; and
   a converter configured to convert the compensation current into compensation torque, and output the compensation torque.

4. The apparatus of claim 3, wherein the frequency calculator calculates the first rotation frequency from the vehicle wheel speed, and calculates the second rotation frequency by multiplying the first rotation frequency by a predetermined multiple.

5. The apparatus of claim 3, wherein the judder compensator comprises:
   a first judder compensator configured to extract a first judder frequency component by filtering the motor current according to the first rotation frequency, and output a first compensation current by compensating for the first judder frequency component according to the vehicle speed;
   a second judder compensator configured to extract a second judder frequency component by filtering the motor current according to the second rotation frequency, and output a second compensation current by compensating for the second judder frequency component according to the vehicle speed; and
   a calculator configured to output the compensation current obtained by adding up the first and second compensation currents.

6. The apparatus of claim 5, wherein the first judder compensator comprises:
   a first judder frequency extraction unit configured to extract a first judder frequency component, caused by the judder, from the motor current through a band-pass filter whose filter coefficient is changed according to the first rotation frequency;
   a first phase shifting unit configured to shift the phase of the first judder frequency component by applying a phase value, set for the vehicle speed, to the extracted first judder frequency component; and a first gain application unit configured to calculate the first compensation current by applying a gain, set for the vehicle speed, to the phase-shifted first judder frequency component.

7. The apparatus of claim 5, wherein the second judder compensator comprises:
a second judder frequency extraction unit configured to extract a second judder frequency component, caused by the judder, from the motor current through a band-pass filter whose filter coefficient is changed according to the second rotation frequency;
a second phase shifting unit configured to shift the phase of the second judder frequency component by applying a phase value, set for the vehicle speed, to the extracted second judder frequency component; and
a second gain application unit configured to calculate the second compensation current by applying a gain, set for the vehicle speed, to the phase-shifted second judder frequency component.

8. The apparatus of claim 1, wherein the judder frequency extractor comprises:
a first judder frequency extraction unit configured to extract a first judder frequency component, caused by the judder, from the steering torque through a band-pass filter whose filter coefficient is changed according to the first rotation frequency;
a second judder frequency extraction unit configured to extract a second judder frequency component, caused by the judder, from the steering torque through a band-pass filter whose filter coefficient is changed according to the second rotation frequency; and
an addition unit configured to output the judder signal obtained by adding up the first and second judder frequency components.

9. The apparatus of claim 1, wherein the operation determiner outputs the operation state signal instructing the judder compensation logic unit to operate, when the brake is being operated, and outputs the operation state signal instructing the judder compensation logic unit to operating, when the brake is not being operated.

10. A method for reducing vibration of a steering wheel, the method comprising:
determining, by a judder compensation diagnosis unit, an operation state of a judder compensation logic unit based on vehicle wheel speed, steering torque and a brake state, and outputting an operation state signal according to the determined operation state, the operation state signal instructing the judder compensation logic to operate when a magnitude of a judder signal is below a preset threshold value or instructing the judder compensation logic unit to stop operating when the magnitude of the judder signal is equal to or more than the preset threshold value, the outputting of the operation state signal comprising:
calculating, by a frequency calculator, a first rotation frequency and a second rotation frequency from the vehicle wheel speed;
extracting, by a judder frequency extractor, a judder frequency component, caused by a judder of the steering wheel, by filtering the steering torque according to the first or second rotation frequency;
calculating, by a magnitude calculator, the magnitude of the judder signal by filtering an absolute value of the judder signal, generated by the extracted judder frequency component, through a low band-pass filter; and comparing, by an operation determiner, the magnitude of the judder signal to the preset threshold value, determining an operation state of the judder compensation logic unit based on a comparison result and a brake state, and outputting the operation state signal according to the determined operation state; and
receiving, by the judder compensation logic unit, the operation state signal, instructing the judder compensation logic unit to operate, from the judder compensation diagnosis unit, and calculating judder compensation torque for removing a judder which occurs in a steering wheel of a vehicle, based on one or more of a motor current, vehicle speed and the vehicle wheel speed, when the operation state signal is an operation signal.

11. The method of claim 10, further receiving, by a steering motor control logic unit, the judder compensation torque from the judder compensation logic unit, and removing the judder of the steering wheel by reflecting the judder compensation torque into motor torque.

12. The method of claim 10, wherein the extracting of the judder frequency component comprises:
extracting, by the judder frequency extractor, a first judder frequency component, caused by the judder, from the steering torque through a band-pass filter whose filter coefficient is changed according to the first rotation frequency;
extracting, by the judder frequency extractor, a second judder frequency component, caused by the judder, from the steering torque through a band-pass filter whose filter coefficient is changed according to the second rotation frequency; and
outputting, by the judder frequency extractor, the judder signal obtained by adding up the first and second judder frequency components.

13. The method of claim 10, wherein in the determining of the operation of the judder compensation logic unit,
the operation determiner outputs the operation state signal instructing the judder compensation logic unit to operate, when the brake is being operated, and outputs the operation state signal instructing the judder compensation logic unit to stop operating, when the brake is not being operated.

14. The method of claim 10, wherein the calculating of the judder compensation torque comprises:
calculating, by a frequency calculator, a first rotation frequency and a second rotation frequency from the vehicle wheel speed;
extracting, by a judder compensator, a judder frequency component by filtering the motor current according to the first or second rotation frequency, and outputting a compensation current by applying a gain, set for the vehicle speed, to the judder frequency component; and
converting, by a converter, the compensation current into compensation torque, and outputting the compensation torque.

15. The method of claim 14, wherein in the calculating of the first and second rotation frequencies,
the frequency calculator calculates the first rotation frequency from the vehicle wheel speed, and calculates the second rotation frequency by multiplying the first rotation frequency by a predetermined multiple.

16. The method of claim 14, wherein the outputting of the compensation current comprises:
extracting, by a first judder compensator, a first judder frequency component by filtering the motor current according to the first rotation frequency, and outputting a first compensation current by compensating for the first judder frequency component according to the vehicle speed;

extracting, by a second judder compensator, a second judder frequency component by filtering the motor current according to the second rotation frequency, and outputting a second compensation current by compensating for the second judder frequency component according to the vehicle speed; and outputting, by a calculator, the compensation current obtained by adding up the first and second compensation currents.

17. The method of claim 16, wherein the outputting of the first compensation current comprises:

extracting, by the first judder compensator, a first judder frequency component, caused by the judder, from the motor current through a band-pass filter whose filter coefficient is changed according to the first rotation frequency;

shifting, by the first judder compensator, a phase of the first judder frequency component by applying a phase value, set for the vehicle speed, to the extracted first judder frequency component; and calculating, by the first judder compensator, the first compensation current by applying a gain, set for the vehicle speed, to the phase-shifted first judder frequency component.

18. The method of claim 16, wherein the outputting of the second compensation current comprises:

extracting, by the second judder compensator, a second judder frequency component, caused by the judder, from the motor current through a band-pass filter whose filter coefficient is changed according to the second rotation frequency;

shifting, by the second judder compensator, a phase of the second judder frequency component by applying a phase value, set for the vehicle speed, to the extracted second judder frequency component; and calculating, by the second judder compensator, the second compensation current by applying a gain, set for the vehicle speed, to the phase-shifted second judder frequency component.

* * * * *